US007717569B2

(12) United States Patent
Sokeila et al.

(10) Patent No.: US 7,717,569 B2
(45) Date of Patent: May 18, 2010

(54) PROJECTOR SCREEN WITH ONE OR MORE MARKERS

(75) Inventors: Tomi Sokeila, Tampere (FI); Tapani Leppänen, Tampere (FI); Mika Pesonen, Tampere (FI); Kimmo Kuusilinna, Tampere (FI); Aki Launiainen, Tampere (FI)

(73) Assignee: Nokia Corporation, Espoo (FI)

( * ) Notice: Subject to any disclaimer, the term of this patent is extended or adjusted under 35 U.S.C. 154(b) by 574 days.

(21) Appl. No.: 11/404,379

(22) Filed: Apr. 13, 2006

(65) Prior Publication Data

US 2007/0242233 A1   Oct. 18, 2007

(51) Int. Cl.
G03B 21/14   (2006.01)
G03B 21/56   (2006.01)
G03B 21/58   (2006.01)

(52) U.S. Cl. ......................................... 353/69; 359/450

(58) Field of Classification Search .................. 353/28, 353/69–70; 359/443, 450, 459, 491
See application file for complete search history.

(56) References Cited

U.S. PATENT DOCUMENTS

| 2,296,589 | A | * | 9/1942 | Yule | 252/301.34 |
| 4,690,653 | A | * | 9/1987 | Goldberg | 446/27 |
| 5,845,340 | A | * | 12/1998 | Frislie | 2/202 |
| 6,554,431 | B1 | * | 4/2003 | Binsted et al. | 353/28 |
| 6,614,170 | B2 | * | 9/2003 | Wang et al. | 313/498 |
| 6,729,731 | B2 | | 5/2004 | Gnanamgari et al. | |
| 2002/0021418 | A1 | * | 2/2002 | Raskar | 353/69 |
| 2002/0024640 | A1 | * | 2/2002 | Ioka | 353/94 |
| 2003/0038927 | A1 | | 2/2003 | Alden | |
| 2003/0038928 | A1 | | 2/2003 | Alden | |
| 2003/0222849 | A1 | | 12/2003 | Starkweather | |
| 2004/0021672 | A1 | | 2/2004 | Wada | |
| 2004/0027328 | A1 | | 2/2004 | Yang | |
| 2004/0201823 | A1 | * | 10/2004 | Raskar et al. | 353/69 |
| 2005/0068762 | A1 | * | 3/2005 | Post et al. | 362/105 |
| 2005/0270644 | A1 | * | 12/2005 | Devos et al. | 359/461 |
| 2006/0038962 | A1 | * | 2/2006 | Matsumoto et al. | 353/69 |
| 2007/0040800 | A1 | * | 2/2007 | Forlines et al. | 345/158 |

FOREIGN PATENT DOCUMENTS

| WO | 03/019287 | 3/2003 |
| WO | 03/090059 | 10/2003 |
| WO | WO 2004036310 A1 * | 4/2004 |
| WO | 2004/107039 | 12/2004 |

OTHER PUBLICATIONS

Li et al ("Automatic Keystone Correction for Smart Projectors with Embedded Camera" , 2004. IEEE 2004 International Conference on Image Processing, vol. 4, Oct. 24-27, 2004 pp. 2829-2832).*
Sukthankar et al ("Smarter Presentation: Exploiting Homography in Camera-Projector Systems", Proceedings. Eighth IEEE International Conference on Computer Vision, vol. 1, Jul. 7-14, 2001 pp. 247-253).*
Definition of "parachute". Collins English Dictionary, 2000 Edition.*
International Search Report, International Application No. PCT/EP2007/003079, Form PCT/ISA/210 (1 page) dated Nov. 7, 2007.

* cited by examiner

*Primary Examiner*—Christopher E Mahoney
*Assistant Examiner*—Leon Rhodes

(57) ABSTRACT

A projector screen includes one or more markers that are configured to be usable by projection processing circuitry in order to calculate a user perceived distortion in an image to be projected on the projector screen.

42 Claims, 10 Drawing Sheets

PROJECTOR SCREEN WITH ONE OR MORE MARKERS

TECHNICAL FIELD OF THE INVENTION

Aspects and embodiments of the present invention relate to the field of image projection, and apparatus and methods associated with image (i.e. content) projection. In particular, the image projection requires light projection from a projector onto a (e.g. blank) screen. The purpose of the screen is to act as a reflection surface on which the projected light may appear. Specific embodiments relate to correcting projected image distortions in user portable devices.

Such images may be still and/or video images, which may or may not be pre-recorded on a memory on one or more of the apparatus associated with projection. The images may be received from remote (e.g. broadcast) transmissions, or be obtained locally, for example, by a device having picture-capturing capability (e.g. still/video camera).

Specific aspects and embodiments relate to telecommunications devices (which may or may not be mobile telecommunication (e.g. cellular) devices). For the sake of convenience, many of the embodiments described herein will be limited to the description of mobile cellular devices and the display projection of content. However, one or more of the aspects and embodiments of the invention are not necessarily limited to such telecommunications devices (including mobile cellular devices) and the display of such content.

BACKGROUND TO THE INVENTION

Videos are increasingly being displayed on handheld displays. However, in certain cases it has been found that videos watched on the contemporary handheld displays should not ordinarily exceed the length of 15-20 minutes to avoid uncomfortable experience by the user. This is at least partly attributable to the small size of handheld displays.

Projection is one of the methods for escaping the bounds of small screens in mobile devices. However, the usability and image quality for projection systems have thus far been such that mobile usage has not been attractive. Also the projection surface (i.e. projection screen) in the mobile environment varies a lot from ideal white screen as you may not have such an ideal white screen on which to project. For example, the projection surface could be textured, colourful, and rough in the case that a user is projecting the image onto the back of an airplane seat. These variations can lead to distortions of a projected image as perceived by a user.

Typically a mobile projector needs good flat surface on which to project the image. Also for a good quality projection, the surface of the projection should be white in colour, and should not have any other colours or patterns. However, such suitable mobile projectors are rarely available.

Even if the projection surface might be flat and single white coloured, the projection set-up might not allow the direct projection of the image onto the screen. This would make the projected image appear to be distorted image on the screen.

Existing projection screens can be rolled into a comparatively small configuration for storing or transport. However, such rolled projection screens are not readily user portable.

One or more aspects and embodiments of the present invention address one or more of the above-mentioned problems.

The image quality of a projected image, particularly in mobile use can be affected by one or more of the following factors:

i) If the image is projected on a moving surface the user perceived image looks to be out-of-focus;
ii) If the image is projected on a solid surface, but projector is moving, the perceived image looks to be out-of-focus;
iii) If the image is projected on a solid surface, with a non-moving projector, but the optics are set incorrectly, the perceived image looks to be out-of-focus;

One or more aspects and/or embodiments of the present invention relate to the provision of auto-focussing for mobile projectors in such environments.

Furthermore, particularly in mobile environments, the projection surface/screen could be e.g. textured, colourful, and rough, which causes distortions to perceived image. In such cases, the projected image quality can be affected. For example, if the image is projected on rough surface the perceived image looks distorted. If the image is projected on colourful surface the perceived colours may not be correct. If the image is projected on a textured surface, the perceived projected image looks distorted. Furthermore, if the image is projected on a dark surface the perceived projected image looks darker than if it were to be projected on a light surface.

One or more aspects and/or embodiments of the present invention relate to the provision of enhancing image quality, particularly in mobile projectors.

Relative movement between the projector and a projector screen can cause user-perceived distortions. This is particularly so for hand-held projectors and/or projector screens. Image stabilisation would be beneficial. Aspects and/or embodiments of the present invention relate to projected image stabilisation.

When a mobile projector is set-up in a new place of use, the user often needs to manually correct the projected image, for example with keystone correction (to correct for geometric distortions), and/or level the projector horizontally so that the projected image is not appear rotated. Aspects and/or embodiments of the present invention relate to correction of such user perceived distortion.

SUMMARY OF THE INVENTION

According to a first aspect, the present invention provides a projector screen, the projector screen comprising one or more markers arranged to be used by projection processing circuitry to calculate a user perceived distortion in an image to be projected on the projector screen. The one or more markers may be arranged to be used by projection processing circuitry to calculate a user perceived distortion in an image projected on the projector screen.

The one or more markers may comprise light emitting markers.

The one or more markers may comprise light emitting markers, the light emitting markers having a light emitting state and a non-light emitting state, and where the light emitting state is provided by an energy source.

The one or more markers may comprise light emitting markers, the light emitting markers having a light emitting state and a non-light emitting state, and where the light emitting state is provided by an integral energy source.

The one or more markers may comprise light emitting markers, the light emitting markers having a light emitting state and a non-light emitting state, the projector screen comprising user interface circuitry to move the one or more markers into the light emitting state from the non-light emitting state.

The one or more markers may comprise light emitting markers, the light emitting markers having a light emitting state and a non-light emitting state, the projector screen comprising user interface circuitry to receive a signal command to move the one or more markers into the light emitting state from the non-light emitting state, the user interface circuitry being arranged to receive the signal command from a user interface element located on the screen.

The one or more markers may comprise light emitting markers, the light emitting markers having a light emitting state and a non-light emitting state, the projector screen comprising user interface circuitry to receive a signal command to move the one or more markers into the light emitting state from the non-light emitting state, the user interface circuitry being arranged to receive the signal command from a remote source.

The one or more markers may comprise light emitting markers, the light emitting markers having a light emitting state and a non-light emitting state, the projector screen comprising user interface circuitry to receive a signal command to move the one or more markers into the light emitting state from the non-light emitting state, the user interface circuitry being arranged to receive the signal command from a remote control source, the signal command being transmitted from the remote control source to the user interface circuitry under the initiation of a user.

The one or more markers may comprise light emitting markers, the light emitting markers having a light emitting state and a non-light emitting state, the projector screen comprising user interface circuitry to receive a signal command to move the one or more markers into the light emitting state from the non-light emitting state, the user interface circuitry being arranged to receive the signal command from a remote control source, the signal command being transmitted from the remote control source to the user interface circuitry without the initiation of a user.

The one or more markers may comprise light emitting markers, the light emitting markers having a light emitting state and a non-light emitting state, the projector screen comprising user interface circuitry to receive a signal command to move the one or more markers into the light emitting state from the non-light emitting state, the user interface circuitry being arranged to receive the signal command from a remote control source, the signal command being transmitted from the remote control source to the user interface circuitry over an air interface.

The one or more markers may comprise light emitting markers, the light emitting markers having a light emitting state and a non-light emitting state, the projector screen being arranged to move the one or more markers into the light emitting state from the non-light emitting state at predetermined intervals.

The one or more markers may comprise light emitting markers arranged to emit light in the non-visual spectrum.

The one or more markers may comprise light emitting markers arranged to emit light in the visual spectrum.

The one or more markers may comprise light emitting markers arranged to emit light in the visual spectrum, and wherein the markers comprise fluorescent material.

The one or more markers may comprise light emitting markers arranged to emit light in the visual spectrum, and wherein the markers comprise a fluorescent paint applied to the surface of the projector screen.

The one or more of the markers may be of a colour distinct from the colour of the projection viewing area. The one or more of the markers may be of an illumination intensity (e.g. brighter) distinct from the illumination intensity of the projection viewing area.

The one or more markers may be positioned around the projection viewing area of the screen.

The one or more markers may be positioned around the projection viewing area to form a frame around the projection viewing area.

The projector screen may be portable.

The projector screen may comprise a projection viewing area made from a foldable material.

The projector screen may comprise a projection viewing area made from a foldable parachute-based material.

According to second aspect, the present invention comprises projector screen user interface circuitry arranged to control the activation of one or more projector screen light emitting markers, the light emitting markers having a light emitting state and a non-light emitting state and being arranged to be used by projection processing circuitry to calculate a user perceived distortion in an image to be projected on the projector screen when one or more of the markers are in a light emitting state, the projector screen user interface circuitry being arranged to receive a signal command to move the one or more markers into the light emitting state from the non-light emitting state.

According to a third aspect, the present invention provides a portable projector screen, the projector screen comprising a projection viewing area, and wherein the projection viewing area is made from a foldable material.

Existing projection screens cannot be folded into a small configuration for user-portable transport.

The foldable material may comprise some parachute material. The foldable material may be a parachute material. The foldable material may have similar foldable properties (and/or similar mechanical (e.g. strength) properties) to parachute material.

The projector screen may comprise a collapsible frame in which the unfolded material can be framed to provide the viewing area configured to receive a projected image.

The projection viewing area may be made from a semi-transparent material allowing viewing of a projected image from the viewing area and from an area on the reverse face of the viewing area.

According to a fourth aspect, the present invention provides projection processing circuitry comprising: image capturing circuitry arranged to provide digital capturing of a reference picture image to provide reference picture image data;

distortion calculating circuitry arranged to calculate user perceived distortion of the reference picture image to generate one or more correction parameters using the reference picture image data;

projection image circuitry arranged to use one or more of the correction parameters to adjust the projection properties of a subsequent projection image to compensate for the user perceived distortion.

The distortion correction parameters may be generated by comparing one or more properties of the captured digital reference picture image determined from the reference picture data with one or more predetermined properties of the reference picture.

The projection circuitry may be arranged to project one or more reference images.

The image capturing circuitry may be arranged to capture a reference picture in the visual part of the spectrum.

The image capturing circuitry may be arranged to capture a reference picture in the non-visual part of the spectrum.

The projection processing circuitry may be comprised in a user-portable device. The image capturing circuitry may be comprised in a user-portable device. The distortion calculating circuitry may be comprised in a user-portable device. The projection image circuitry may be comprised in a user-portable device.

A user-portable device may comprise the image capturing circuitry, and the device may be arranged to be connectable to the image distortion calculating circuitry.

A user-portable device may comprise the image capturing circuitry, and the device may be arranged to be connectable to the projection image circuitry.

The image capturing circuitry may be arranged to provide reference picture data relating to the image quality of the reference picture, the image quality relating to the intrinsic properties of the reference picture.

The image capturing circuitry may be arranged to provide reference picture data relating to the image quality of the reference picture, the image quality relating to the intrinsic properties of the reference picture, the intrinsic property including one or more of brightness, colour correction, auto white balance, contrast, background texture information.

The distortion calculating circuitry may be arranged to use the distance between a projector apparatus and image capturing apparatus to calculate one or more correction parameters.

The image capturing circuitry may be arranged to capture the relative movement of the projector with respect to a reference image on a projection screen to determine reference picture image data relating to the relative movement.

The distortion calculating circuitry may be arranged to calculate the relative movement of the projector with respect to a reference image on a projection screen to determine correction parameters to compensate for the relative movement.

The image capturing circuitry may be arranged to capture the relative movement of the projector with respect to a reference image on a projection screen by capturing the movement of the reference image within a captured view to determine reference picture image data relating to the relative movement.

The image capturing circuitry may be arranged to capture the geometric distortion of a reference image on a projection screen to determine reference picture image data relating to geometric distortion.

The distortion calculating circuitry may be arranged to calculate the geometric distortion of a reference image to determine correction parameters to compensate for the geometric distortion.

The image capturing circuitry may be arranged to capture the rotational distortion of a reference image on a projection screen to determine reference picture image data relating to rotational distortion.

The distortion calculating circuitry may be arranged to calculate the rotational distortion of a reference image to determine correction parameters to compensate for the rotational distortion.

The projection processing circuitry may be arranged to detect laser light to provide user input to the projection processing circuitry.

According to a further aspect, the present invention provides a method of projecting an image on a screen comprising
digitally capturing a reference picture to provide digitally captured reference picture image data;
calculating user perceived distortion of the reference picture image;
generating one or more correction parameters based on the user perceived distortion calculation;
preparing a subsequent projection image using one or more of the correction parameters to adjust the projection properties of the subsequent projection image to compensate for the user perceived distortion.

The calculating step may comprise comparing one or more properties of the captured digital reference picture image obtained from the reference picture image data with one or more predetermined properties of the reference picture.

The invention encompasses one or more of the aforementioned and subsequently mentioned features, aspects and embodiments, in isolation and in all various combinations whether or not specifically mentioned in isolation or that combination. One or more of the previously mentioned problems may be addressed by the various combinations. Corresponding methods, computer code (e.g. stored on a computer readable medium), circuitry (which may comprise circuitry programmed with computer code) and apparatus comprising the circuitry, are all within the scope of the present invention.

DESCRIPTION OF FIGURES

Specific embodiments of various aspects and/or embodiments of the invention will now be described with reference to the following figures in which.

DETAILED DESCRIPTION OF SPECIFIC EMBODIMENTS

Figure 7:
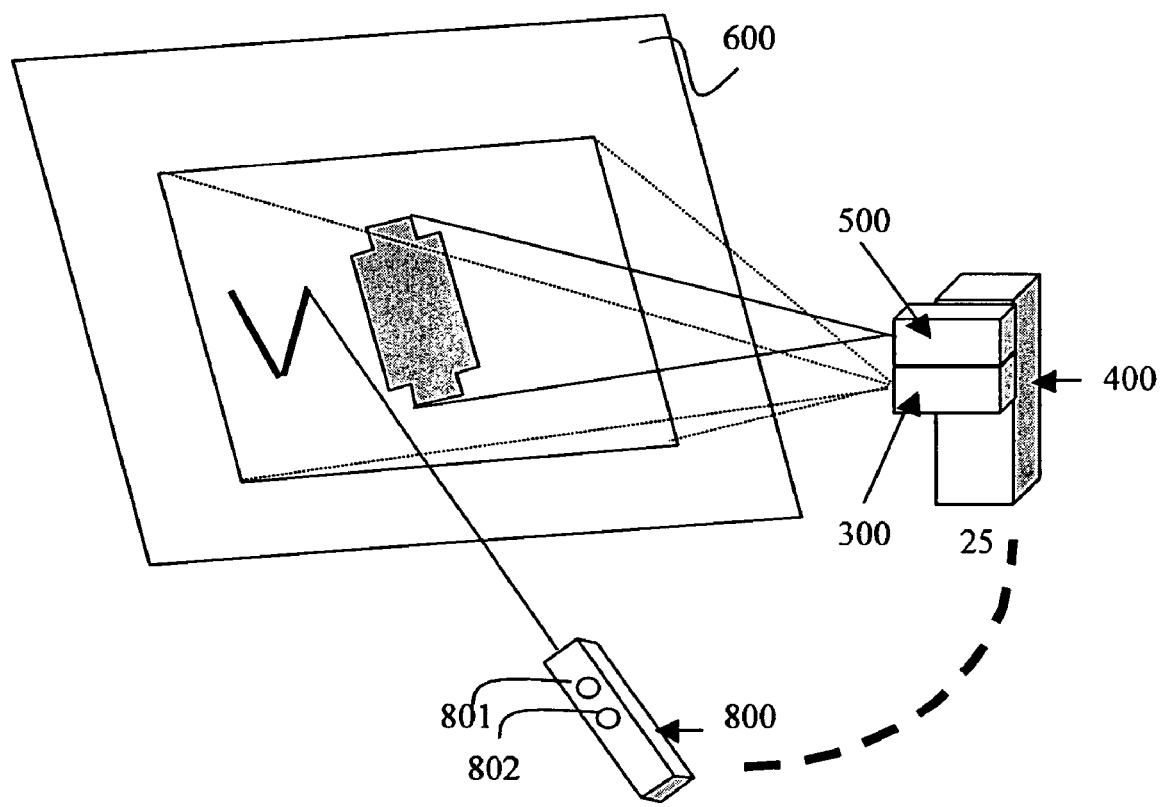
FIG. 7 shows a representation of a projector and camera mounted together on the same mobile frame and the capturing of a special test reference pattern according to one or more aspects and/or embodiments of the present invention.

Using image projection, a small mobile device can escape the bounds of its diminutive screen. Using a camera, the projected image, or in some cases features from the environment, can be fed back to the image formation process and the image quality corrected. The image manipulation is based on digital signal processing with the exception that mechanical and optical functions, which happen to be available in the projector hardware, can be exploited. In addition, the combination of the projector, camera, and a laser pen allows user interfaces that are based on "drawing" on the projected image (FIG. 7). The device could also use speech recognition to accept voice commands.

Use case 1: The user wants to view a movie in a bus/train/aeroplane. The user holds the device containing the projector and the camera on her lap and projects an image to the back of the opposing seat. The camera is used to record the projected image and the image subsequently automatically focused, the contrast set, and the imperfections of the reflecting surface compensated. Most importantly, the projector-camera-digital signal processing loop can compensate for vibrations of the vehicle. That is, although the projector and the screen move in relation to each other, the projected image remains stable. The device can be controlled by drawing on the screen with a laser pen or through speech recognition.

Use case 2: The user wants to use the device as a mobile presentation aid. The user arrives at the location of the presentation and sets the device on a table. As in use case 1, the device optimises the projected image and the whole arrangement is ready to use with minimal set-up time. The laser pen is used both to guide the flow of the presentation and in its traditional usage mode, as a pointing device. The laser pen can also be used to leave persisting marks and notes on the presentation slides.

Use case 3: TV replacement. At her home, the user connects the device to a wall plug and places it on a table. Either through a connection to a cable network or through mobile TV broadcasts, TV programming is projected on a wall. The device can use its own speakers or connect (wirelessly) to the speakers already present in the room.

Use case 4: Enhanced reality. The user works as a repairer of complex machinery and has to carry out on-site repairs. Using special software, the camera can record an image of the current machine and, using pattern recognition, the device identify the machine in question (by comparison with a database of appropriate image data). One the blueprints have been read from a database, the blueprints can be projected on the machine surface to assist with repairs. The projector-camera-digital signal processing loop is again used to ensure that the image is properly aligned and is legible as possible.

The various aspects of the present invention are considered below. Wherever possible the same reference numerals have been used to relate to corresponding features in the various embodiments illustrated in the figures. For ease of reading, the various aspects are discussed separately. However, it will be appreciated that one or more of the aspects and embodiments can be used in one or more combinations.

Let us consider an image projection screen, and associated methods and apparatus, according to one or more aspects of the present invention. Consider FIG. 1 in which a projection set-up shows a projector 500 arranged with respect to a projection screen 600. A mobile cellular device (e.g. mobile phone) 400 is also shown positioned on the projector 500. The mobile phone 400 has a camera 300.

The screen 600 comprises a flexible/foldable canvas 602 suitable for image projection, which is held tight within a rigid frame 603. In this embodiment, the rectangular landscape oriented projection screen 600 is shown with a central viewing area 601 onto which an image is to be projected. The central viewing area 601 is white in colour and is made from a parachute material. In this embodiment, the perimeter of viewing area 601 is also made of the same parachute material (i.e. it is one continuous sheet). The rigid frame 603 and the canvas 602 are arranged such that the surface of the canvas 602 provides a substantially tight (e.g. without creases) projection viewing area 601, which is free from features which would cause distortion in an image projected thereon.

The rigid frame is made from a number of hollow pipes 603a,b which can be releasably fitted end-on together to form the rigid frame 603. This allows the hollow pipes 603a,b of the rigid frame 603 to be "collapsed" into a configuration for easy user portability. In this embodiment, the canvas 602 can be removed from the frame, for example, by unwrapping the ends of the canvas from around the frame. In other embodiment, the canvas 602 may comprise apertures extending around the canvas perimeter into which the hollow pipes are placed as shown schematically in FIG. 4. To collapse the screen 600, the pipes 603a,b are removed from the apertures to allow folding of the canvas 602.

In a further embodiment still, the rigid frame may be formed from telescopic parts (not shown), which are arranged to be opened to form the frame 603. In an alternate embodiment, the rigid frame 603 may be formed from a flexible wire (not shown), which is arranged to have a folded collapsed configuration and an unfolded configuration. In the folded configuration, the wire is folded back upon itself and in the unfolded configuration the wire frame opens into a rigid frame 603. The wire is made of a material which has a tendency to open out into the unfolded configuration unless it is secured (for example, by a securing member such as a clip, or by the nature of the folded configuration (i.e. folded onto itself to inhibit opening)).

Figure 1:
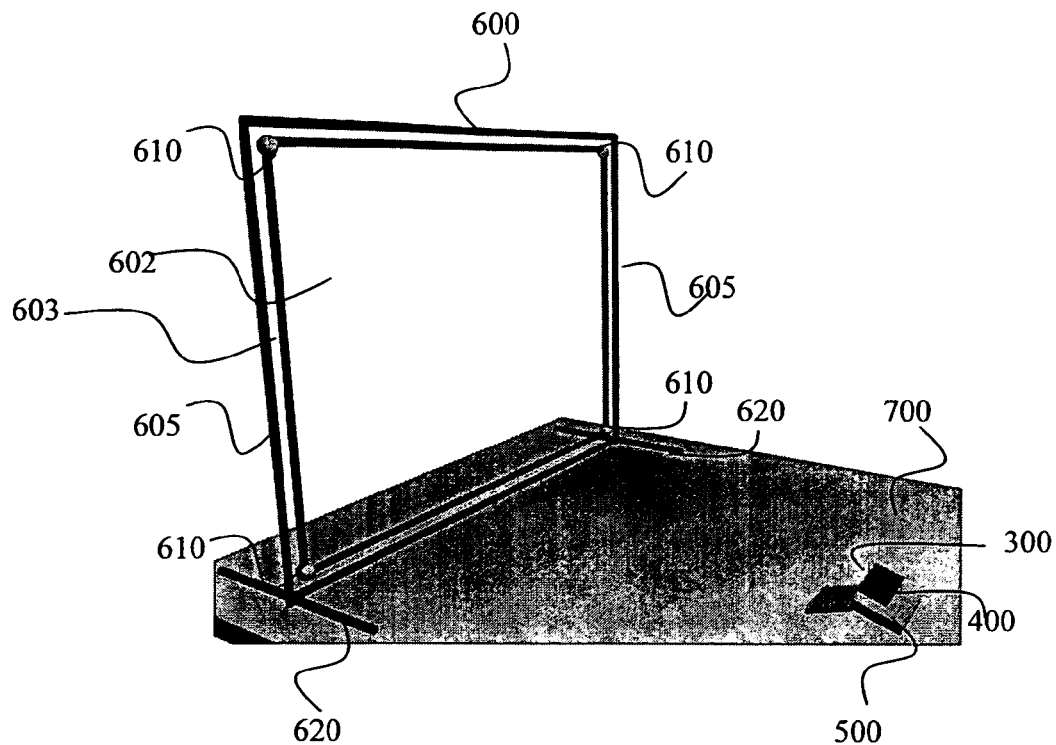
FIG. 1 shows a perspective view of a projection set-up in one scenario according to one or more aspects and embodiments of the present invention.
Figure 3:
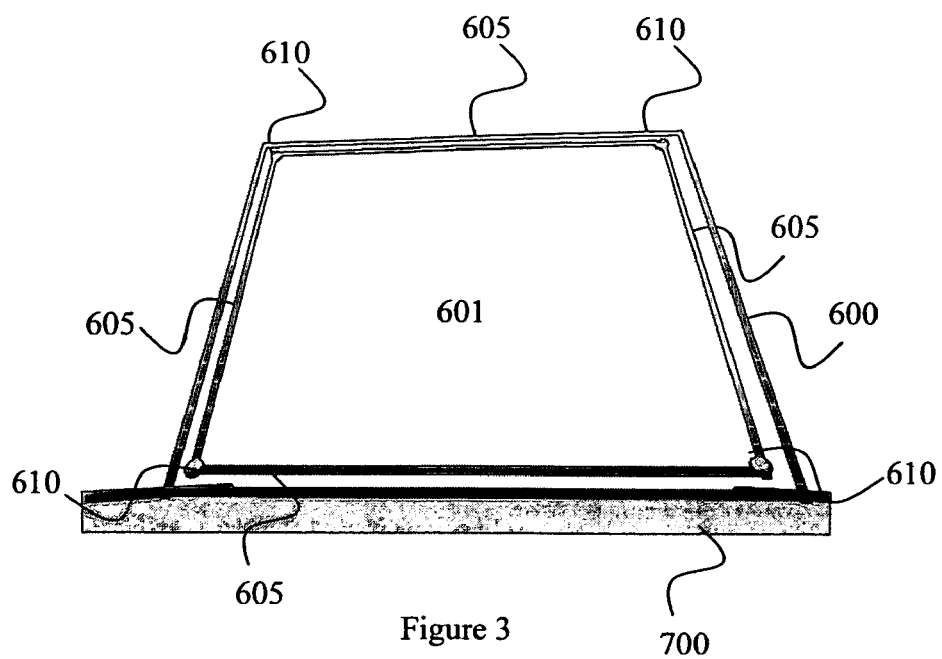
FIG. 3 shows a representation of the "distorted view" of a projector in the configuration of FIG. 1.

The screen 600 can be leant on a surface 700, for example a (e.g. vertical) wall, or comprise a supporting arrangement (e.g. legs 620) which can be used to rest the screen 600 on a surface (e.g. table 700, FIGS. 1, 3). The supporting arrangement 620 may allow the screen 600 to have a number of fixed upright tilting positions.

As previously mentioned, the canvas 602 is formed form a parachute material. This kind of material allows the user to compress the screen 600 into a smaller space. Such a material is also semi-transparent, and thus allows a projected image to be viewed from both the front and rear face of the projection screen 600. The canvas 602 may be formed from a one piece material or may be formed from a plurality of pieces of material attached (e.g. sewn, glued) together.

Figure 4:
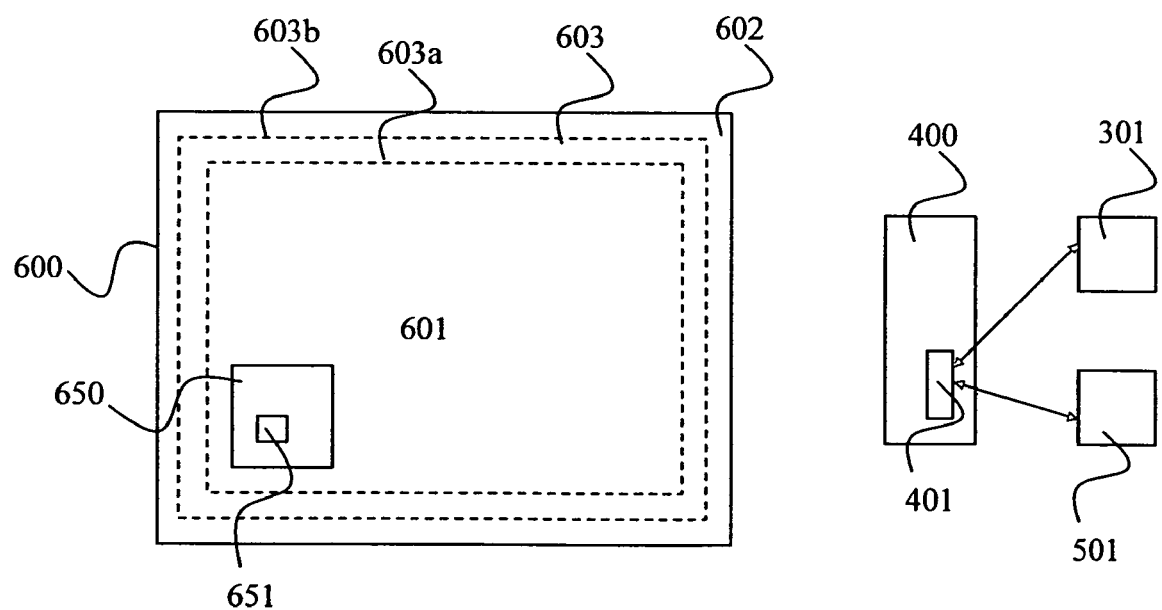
FIG. 4 shows a schematic representation of circuitry (e.g. electronic components including one or more processors) according to one or more aspects of the invention.

The screen 600 includes one button 651 and associated electronics (i.e. circuitry 650) that are used in the distortion correction process. The circuitry 650 may be comprised in the 603 frame or in a non-viewing area of the canvas (FIG. 4, not drawn to scale).

The portable screen 600 includes four small lights 610 (e.g. Light Emitting Diodes, LEDs) located in each corner. These lights 610 can be used to calculate the distortion correction (and can be considered to be distortion markers). The lights do not have to operate in the visual part of the spectrum, but could operate in the infrared wavelength (if the mobile phone camera 300 allows capturing this kind of image) so the lights would be invisible to a user when used for distortion correction (e.g. when the LEDs blink).

The button 651 may be placed behind one (or more) of the LEDs 610, so that depression of the respective LED is associated with depression/actuation of the button 651.

Figure 5:
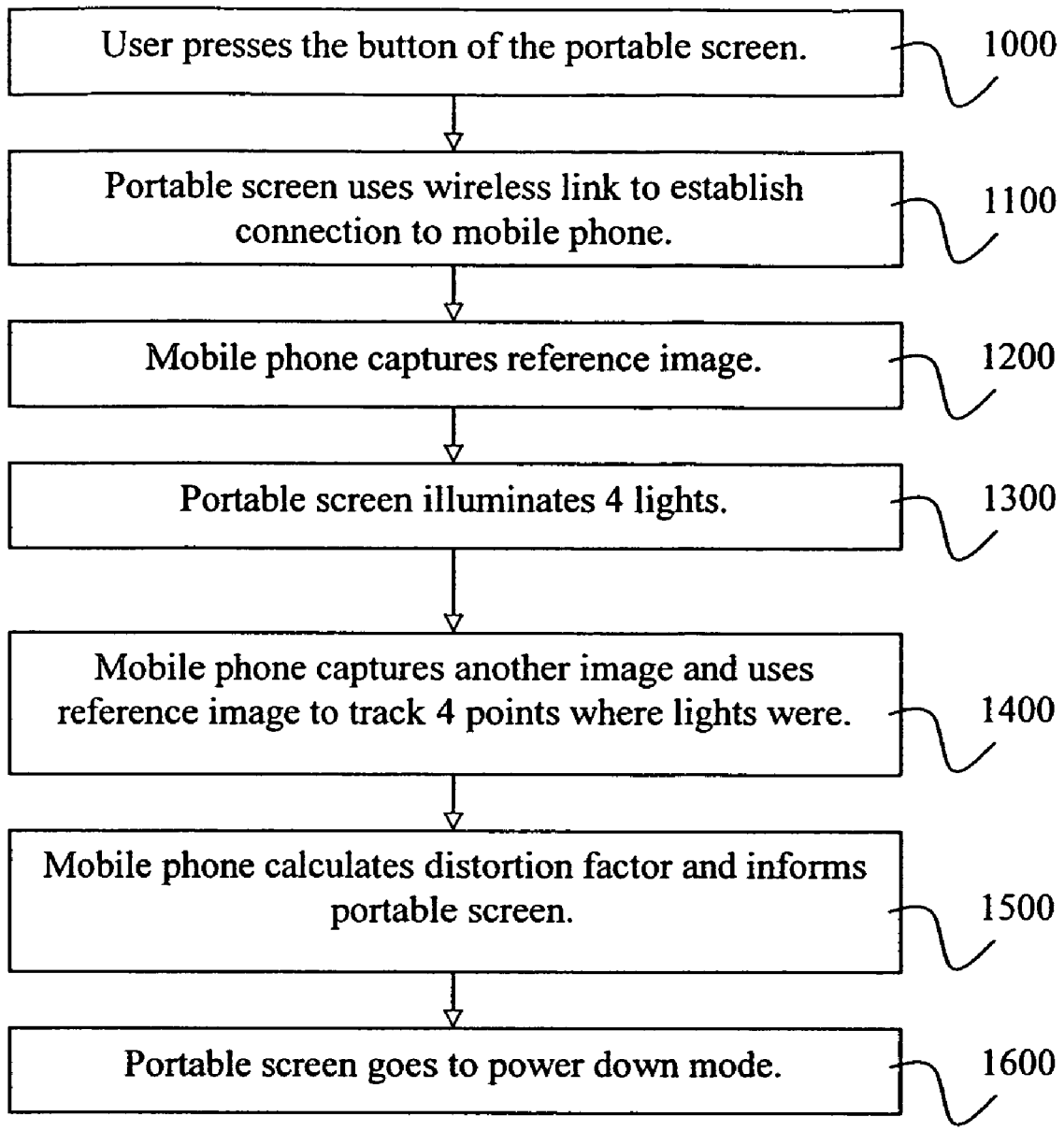
FIG. 5 shows a flowchart describing the distortion removal set-up procedure according to one or more aspects and/or embodiments of the present invention.

The portable screen 600 contains a small battery (not shown), which may be rechargeable, to power the electronic circuitry 650. To conserve power, the circuitry 650 is arranged such that the power is on only when needed, for example, during the distortion correction process. The previously mentioned button 651 is used to turn on the LEDs and initiate the distortion correction process (FIG. 5). In another embodiment, the portable screen 600 is adapted to be connected to an external power supply (not shown).

In addition, or alternately, the screen 600 could also have thin stripes 605 painted around the edges of the screen 600 that could be also used for the distortion correction process. These are placed to extend around the viewing area 601, and thus define a projection-viewing frame. These stripes 605 can also be considered to be distortion markers.

Figure 2:
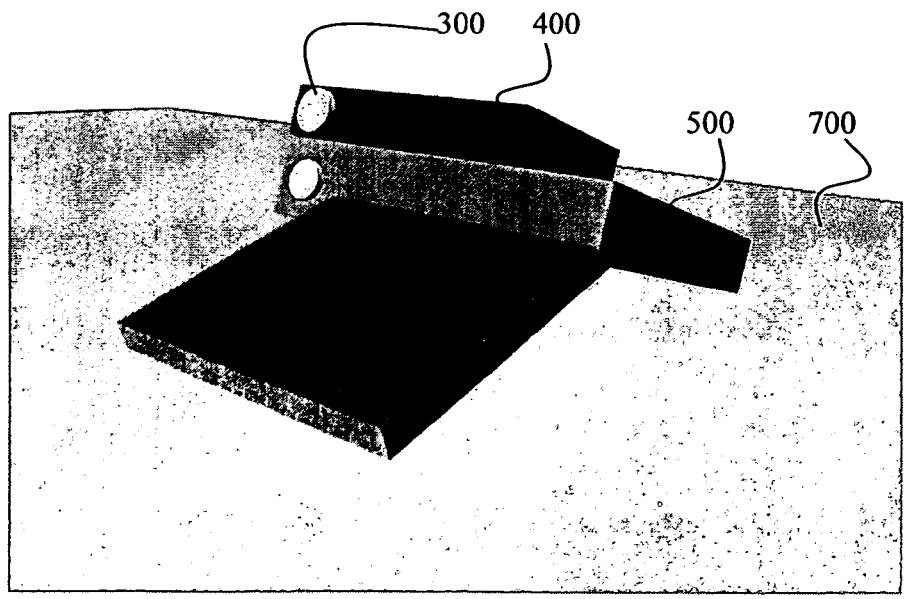
FIG. 2 shows a close up view of the configuration of the projector and mobile cellular device shown in FIG. 1.

Consider a use case in which a user comes to a meeting and wants to show a presentation from his/her mobile phone 400. Firstly, the user connects his/her (e.g. mobile) projector 500 to back of the phone 400 and places the combination on a table 700 (FIG. 2). Then, the user then gets the folded canvas 602, and the folded frame 603a,b for the canvas 602 from his/her pocket. The user then makes up the screen 600 from the frame 603a,b and canvas 602 and places it in front of the projector/phone 500/600.

When the portable screen 600, mobile phone 400 and projector 600 are ready, the user presses the small button 651 of the portable screen 600 and the distorted projected image is automatically corrected by the mobile phone 400. The portable screen 600 and mobile phone 400 communicate wirelessly (using circuitry 401, 650) over the air interface. This use case scenario is illustrated in FIG. 1, and shown schematically in FIG. 4.

As previously mentioned, the mobile phone 400 comprises a camera 300. The camera 300 is mounted parallel to the projector 500 (FIG. 2) so the mobile phone's camera view of the projected image (or screen 600) is that shown in FIG. 3, very similar (possibly the same) as the view of the projector 500 of the projected image (or screen 600). An example of this process is demonstrated in FIG. 5.

In the embodiment illustrated in FIG. 5, this process entails the user pressing the button 651 on the portable screen 600 (step 1000). The portable screen 600 uses a wireless link (e.g. Bluetooth™) over the air interface to establish a connection to the mobile phone 400 (step 1100, using circuitry 401 in the mobile phone 400). The portable screen 600 obviously comprises associated wireless circuitry 650 to allow for the link over the air interface.

This link initiates the mobile phone camera 300 (using circuitry 301) to take one or more reference pictures (step 1200). In the case of taking more than one reference picture, an average of the various pictures can be used as the reference picture.

Once the mobile phone camera 300 has taken the reference picture, a signal is sent from the mobile phone 400 to the screen 600 over the wireless link to activate the four LEDs 610, using the circuitry 401 (step 1300). Once this is done, the mobile phone 400 arranges for the capture of one or more images of the LED lit screen (step 1400), using circuitry 401. Again, in the case of more than one image, the average of the images would be used.

This LED lit image is compared to the previous reference image to track the properties (e.g. position, spacing from one another, illumination size, illumination intensity etc) of the LED to calculate the distortion factor, using circuitry 401 (step 1400/1500).

After the distortion calculation, the mobile phone 400 uses the wireless link to signal the screen 600 that it should power down (step 1500), which leads the screen 600 to power down (step 1600).

One or more of the above processing steps performed in the mobile phone 400 can be done by appropriately adapted projection processing circuitry 401 in the mobile phone 400. This circuitry 401 may comprise one or more processors. One or more of the steps can be done by separate projection processing circuitry 401.

The mobile phone 400 uses the determined distortion factor to adjust any subsequent images which are projected onto the screen 600 using the projector 500. The projection circuitry 501 is used to project the corrected image.

It will be appreciated that user intervention may be used during one or more of the above mentioned steps, and/or the process may be more automated by the use of predetermined timed delays between the various steps in the process. In other embodiments, the camera 300 and mobile phone 400 may not be integrated into one device (i.e. separate camera 300 and mobile phone 400). In another embodiment, the projector 500, camera 300 and mobile phone 400 may be integrated into a single device.

After initial distortion set-up process, the user can watch his/her favourite content. The portable screen 600 is arranged to only use power during the distortion set-up process and therefore battery lifetime is long. This distortion set-up applies only to a static view set where distortion calibration process is only made once.

However, the portable screen 600 or projector 500 could move a little bit, for example, if the user is watching movies in a vehicle, for example, in a train/car/airplane. Calibration may be repeated, particularly if the screen 600 or projector 500 moves a lot. In such cases, the distortion calibration should be made more frequently. In this case, portable screen 600 could go into a power save mode after the first calibration, and could blink the lights only when calibration is requested by the mobile phone 400. This would require little bit more power from the battery of portable screen 600.

Also the calibration process might be arranged to work so that first calibration is made using the lights 610 of the screen 600, whereas while watching the content, the calibration is done using the stripe patterns 605 on the edges of the portable screen 600. This option would require more processing power from the mobile phone 400 while watching movies.

The distortion markers 605, 610 may be a continuous border rather than one or more discrete element. The continuous border may occupy a significant portion of the outer perimeter of the canvas 602.

It will be appreciated that the present invention according to the aforementioned aspects and embodiments helps the image distortion correction process using an intelligent portable screen.

Let us now consider aspects and embodiments which provide auto-focussing for mobile image projectors.

The projection surface in mobile environment varies a lot from the often ideal white projection screen. In mobile environments, the projection surface could move in proportion to the projector during playback due to vibration caused by motion. This causes out-of-focus distortions to the perceived projected image.

Generally speaking, according to one or more aspects and embodiments of the present invention, a camera 300 is used to capture a reference image, which may be a projected "test pattern" image, or be an image of some features from the environment (for example, the markers from the projection screen 600 mentioned above).

The user perceived distortion, caused by the motion, in the reference image is captured by the camera 300. Using knowledge of how the reference picture should look (i.e. its predetermined characteristics/properties) without motion, a comparison can be made to determine the actual distortion in the reference image. The comparison provides calculated distortion correction parameters.

This digitally captured information (i.e. the distortion correction parameters) is fed back to the image formation process and the focus of a subsequently projected image can be appropriately corrected using the distortion correction parameters.

The image manipulation is based on digital signal processing, with the exception that mechanical and optical functions, which happen to be available on the projector hardware, can also or alternatively be exploited (i.e. moving of adjustable optics).

Consider the following user scenarios:

Use case 1: The user wants to view a movie in a bus/train/aeroplane. The user holds the device containing the projector 500 and the camera 300 on her lap and projects an image to the back of the opposing seat. The camera 300 is used to record the projected image and the image subsequently automatically focused, the contrast set, and the imperfections of the reflecting surface compensated.

Use case 2: The user wants to use the device 400 (e.g. a mobile cellular device) as a mobile presentation aid. The user arrives at the location of the presentation and notices that the presentation screen is in a wrong angle to projector 500. The user decides to show the presentation on the screen and sets the device on a table 700. As in use case 1, the device 400 captures the background/projection images, using the camera 300, and uses the captured image to optimise and correct the projected image and focus. Thus, the whole arrangement is ready to use with minimal set-up time.

Figure 6:
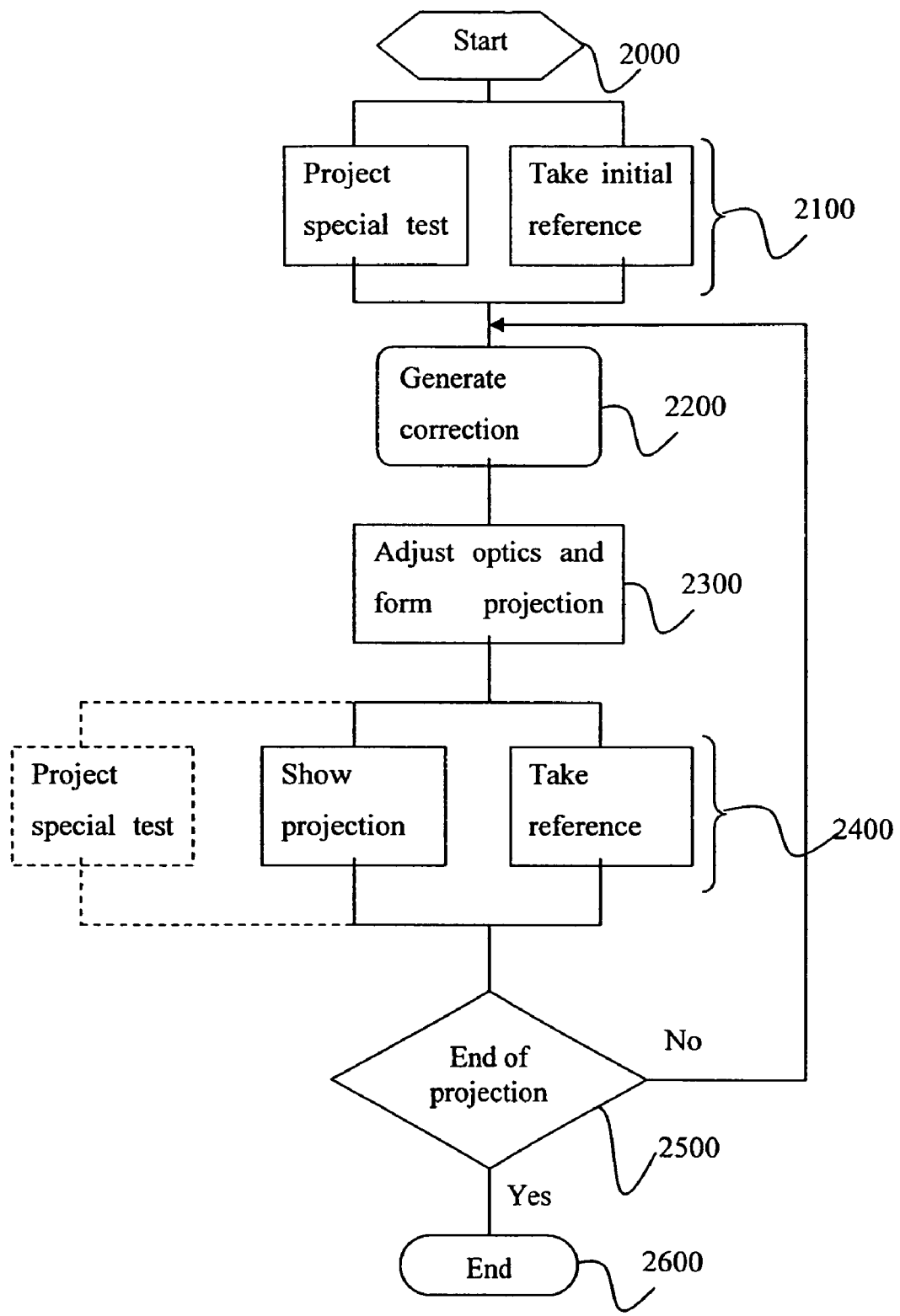
FIG. 6 shows a flowchart outlining a method of auto-focussing for mobile projectors according to one or more aspects and/or embodiments of the present invention.

Consider the flowchart of FIG. 6. In the beginning of projection, the camera 300 is used to take an initial reference picture of the projection surface on which is projected a special focus-pattern 101 (Step 2100, FIG. 6). The special focus-pattern 101 (e.g. FIG. 7) is used to help measurements and detect distortions and movements of the projection surface 600. Rather than project a special focus pattern 101, the screen 600 could itself provide the special focus pattern, e.g. by way of one or more markers (for example, as mentioned previously).

The projected special focus pattern may or may not be within the visual range of a user.

The camera 300 digitises this initial reference image and provides image statistics (which can include histograms containing information about the captured image, geometry information of the test pattern, distance information).

The histograms may, for example, be colour histograms that contain the distribution of different colour bands such red/green/blue. This information can be later used to generate correction parameters (i.e. gamma correction, colour gains etc). The distance information relates to the (vertical/horizontal) distance between the camera and projector. If the projector and camera are not aligned to each other, the distance between these two devices is required. This information can be fixed, for example, if the projector and the camera are the same device, or adjustable if the projector and camera are separate devices. This information can be provided by the user or received automatically through sensors, transmitters, receivers and associated processing circuitry.

These statistics are used generate correction parameters (Step 2200), which are used to correct the focus for the subsequent projected image (step 2300). Such correction can include automatic movement of projector optics, digital image processing to make geometrical corrections to the image to be projected.

Then, an image of this subsequently projected image, which has been corrected using correction parameters, is captured by camera 300 (Step 2400). The special focus-pattern can again be used if the used light wave-length is outside normal vision or the pattern is projected outside/on borders of normal presentation projection area.

Then further reference image statistics are gathered and new correction parameters are formed to second subsequently projected image. The projection process will continue on as presented above until the user stops (ends) the presentation or the last slide/end of the presentation is reached (step 2500, 2600).

The following two implementations are within the scope of the present invention.

Implementation 1: The projector 500 and the camera 300 are physically mounted on the same frame (FIG. 7). This has the advantage that the relation between the projector 500 and the camera 300 is constant and hence this eases image processing.

Implementation 2: The projector 500 and the camera 300 are physically mounted on separate frames (multi-part). This is otherwise the same as Implementation 1, but additional clues from the environment are necessary to perform some of the image manipulation operators. For example, the desired projection geometry needs to be indicated on the screen for the image resizing to work correctly.

A laser pen 800 can be used to provide a wireless interface between the device 400 to control projection (FIG. 7). The laser pen 800 can be used to point to the screen 600 by pressing a button 801. Pressing another button 802 causes the operation to be captured by the camera 300 (information about the different operation modes is passed between the pen 800 and the mobile terminal 400 through a radio link.) The projector 500 can then replay the route drawn by the laser dot, thereby creating a persistent image.

Drawing "strokes" can also be used to control the mobile terminal, like the "V" shown in FIG. 7. This could mean, e.g., "next slide." Laser pen control can also be location sensitive; for instance, pointing to a certain location on the projected image or the background triggers a specific function. Other control mechanisms include speech recognition and the physical UI on the mobile terminal 400 itself.

Let us now consider aspects and embodiments of the invention which relate to enhancing image quality in mobile projectors.

As mentioned above, using a camera 300, the projected image, or in some cases features from the environment, are fed back to the image formation process and the image quality and distortions are corrected. In this case, the image quality issues relate to brightness, colour correction, auto white balance, contrast, background texture etc, for example (i.e. the intrinsic properties of the image as modified by properties of the projection surface).

Again, the image manipulation process is based upon digital signal processing with the exception that mechanical and optical functions, which happen to be available on the projector hardware, can be exploited by using, for example, appropriately controlled motors which can be used to drive this automatic image quality distortion correction (enhancing image quality).

Figure 8:
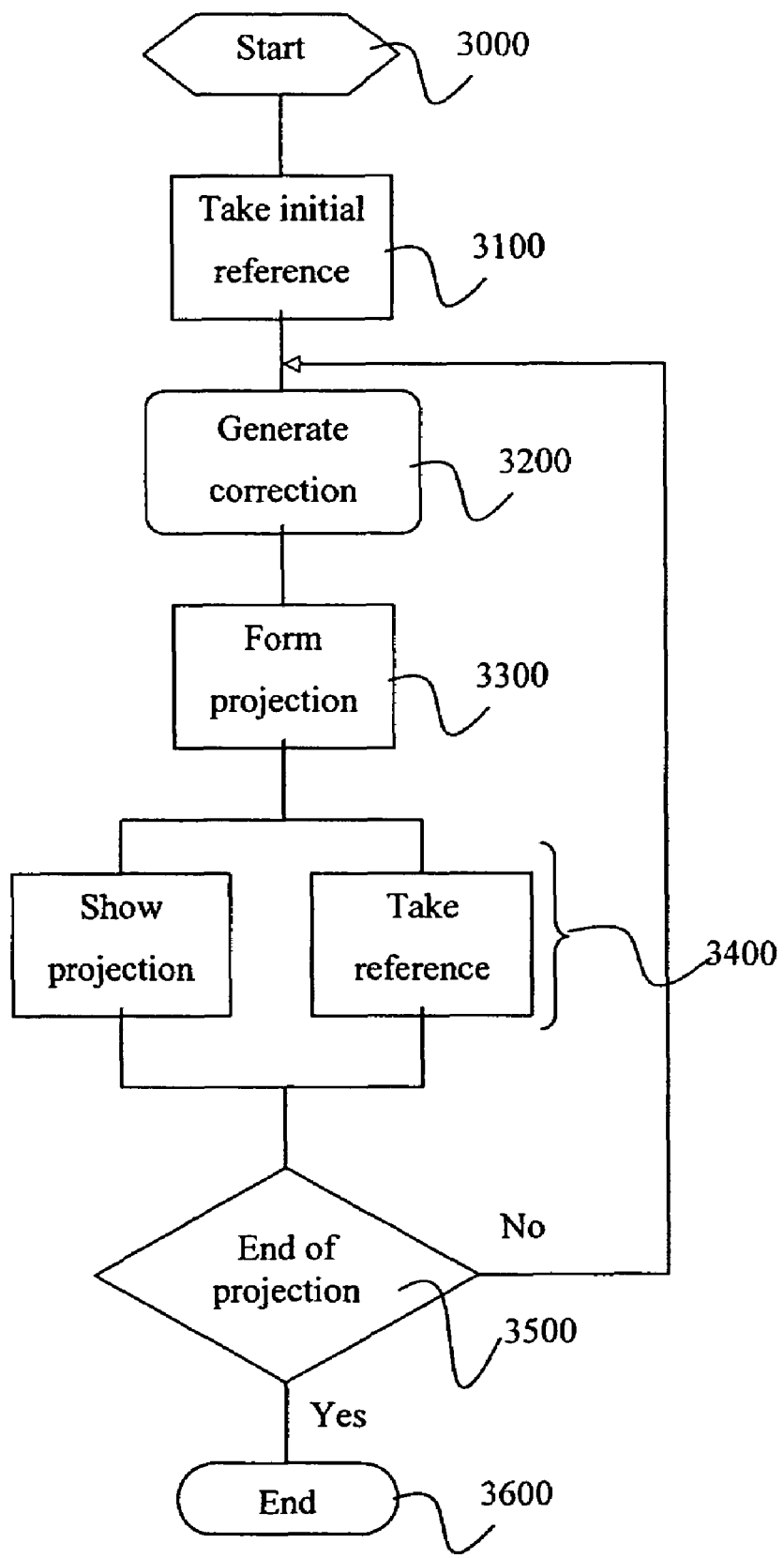
FIG. 8 shows a flowchart outlining a method of enhancing image quality for mobile projectors according to one or more aspects and/or embodiments of the present invention.

The image quality correction process, as shown in FIG. 8, is similar to the process shown in FIG. 6. In the beginning of projection, the camera 300 is used to take initial reference picture of projected surface (step 3100). The initial reference image (or inverse of it or statistics that are gathered from it i.e. histograms) are then used to generate correction parameters (step 3200) which are used correct the first projected image (step 3300). The correction parameters are generated by comparing the captured reference image (and its statistics, histograms and all measures that can be derived from it) and an image which was previously shown (stored in memory) using predetermined/known data. This known data contains information about, for example, the camera/projector lens features/behaviour of the devices, and/or information about the projection environment (either provided by a user or determined automatically by one or more sensors (e.g. light/temperature)).

In case of projection onto a colourful projection screen (blue, yellow etc.), for example, the reference image is that of the projection screen colour. This captured colour is used to produce the best output of the image to be projected, this image to be projected originally being intended for projection onto a white projection screen. The predetermined known data would thus be the properties of the image to be projected when projected on a white screen.

While the first corrected projected image is projected, a further reference picture is taken, this time of the first corrected projected image (step 3400). This further reference image is compared against the original (non-altered/corrected) projected first image, and updated correction parameters are formed. These updated correction parameters are used to correct a subsequent second projected image prior to projection (see return loop in FIG. 8).

The projection process will continue on as presented above until the user stops (ends) the presentation or the last slide/end of the presentation is reached (Step 3500/3600).

The following two implementation scenarios are within the scope of this method.

Implementation 1: The projector 500 and the camera 300 are physically mounted on the same frame 400 (FIG. 7). This has the advantage that the relation between the projector 500 and the camera 300 is constant and hence this eases image processing.

Implementation 2: The projector 500 and the camera 300 are physically mounted on separate frames (multi-part). This is otherwise the same as Implementation 1, but additional clues from the environment are necessary to perform some of the image manipulation operators. For example, the desired projection geometry needs to be indicated on the screen for the image resizing to work correctly.

The following two user scenarios are within the scope of this image quality enhancing invention.

Use case 1: The user wants to view a movie in a bus/train/aeroplane. The user holds the device containing the projector and the camera on her lap and projects an image to the back of the opposing seat. The camera is used to record the projected image and the image subsequently automatically focused, the contrast set, and the imperfections of the reflecting surface compensated.

Use case 2: The user wants to use the device as a mobile presentation aid. The user arrives at the location of the presentation and notices that there is no screen to show presentation. The user decides to show the presentation on rough wall and sets the device on a table. As in use case 1, the device captures the background/projection images and uses them to optimise and correct the projected image and the whole arrangement is ready to use with minimal set-up time.

Figure 9:
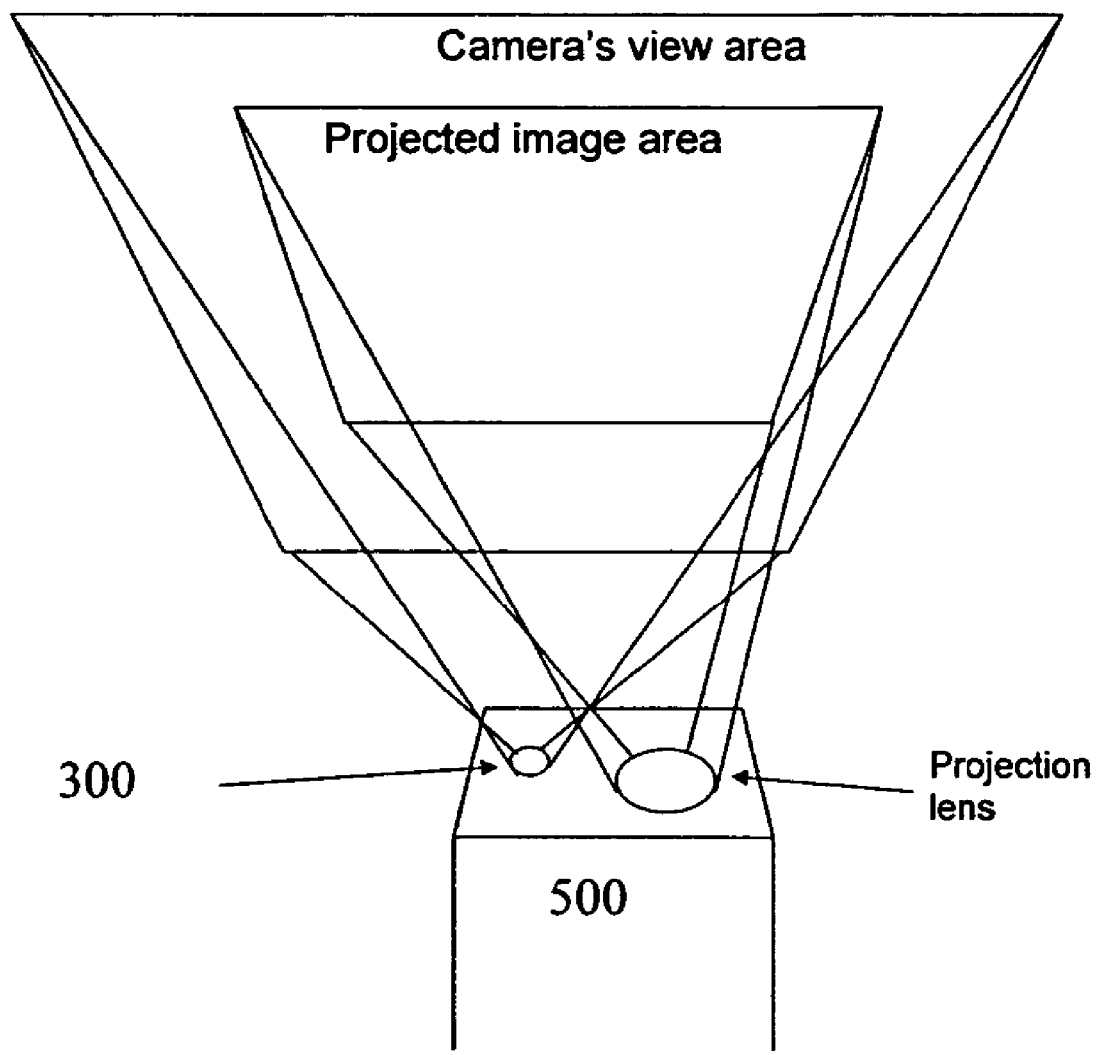
FIG. 9 shows an embodiment of a set-up of a camera and projector device used in image stabilisation according to one or more aspects and/or embodiments of the present invention.
Figure 10:
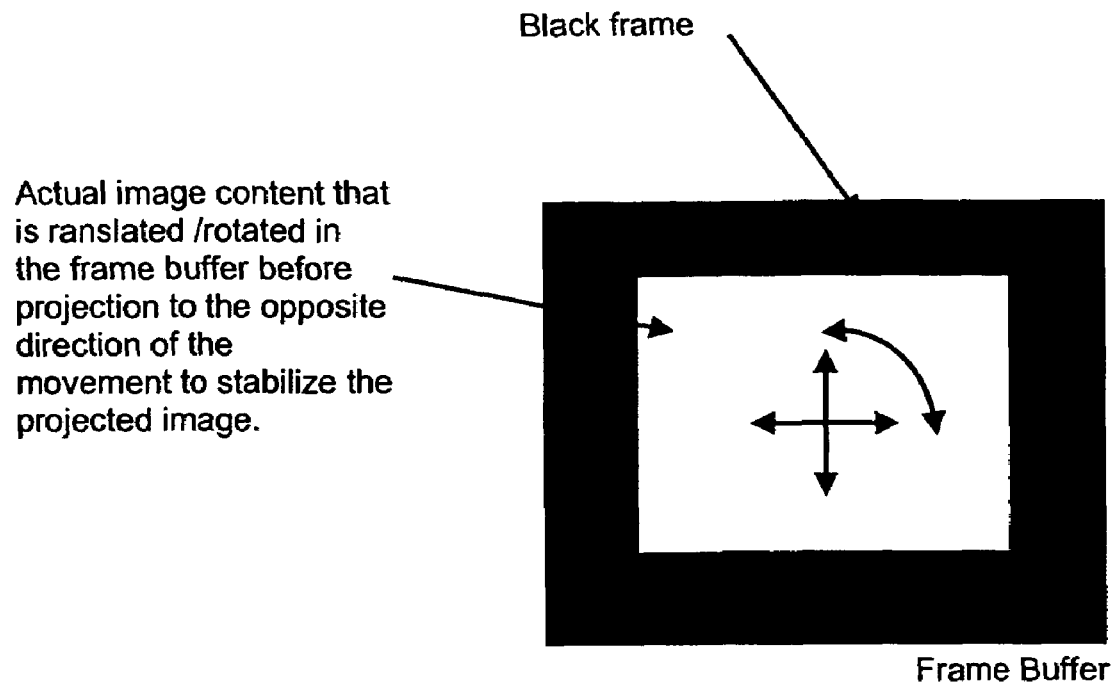
FIG. 10 shows stabilisation in a frame buffer for image stabilisation according to one or more aspects and/or embodiments of the present invention.

Let us now consider image stabilisation (FIGS. 9 and 10). Shaking of the projected image, for example, in hand-held use, is corrected using digital signal processing methods without any mechanical components. A camera sensor (which is contained within camera 300) is attached to the projector device 500. The camera sensor is used to capture a view from the projection surface. The viewing angle of the camera sensor is typically larger than the projection angle (FIG. 9).

The view captured by the camera 300 is used to detect the movement of the projector 500. This movement information is used to compensate for the movement, i.e. stabilization of the projected image. The stabilization is implemented by manipulating the projected image content digitally before the projection.

As shown in FIG. 9, the camera's line of sight is pointing to the direction of the projection. If the projector 500 is shaking, the camera 300 is moving similarly.

The camera 300 can also be mounted on a separate frame apart from the projector 500 (not shown). The camera 300 can be stable with reference to the projection plane, or the camera can also be shaking as long as the camera's view area covers the projected image.

The view captured by the camera 300 is used to detect the movement of the projector 500. The captured projected image is stored in a frame buffer at the same resolution as the projector 500.

During image stabilisation, the full resolution of the frame buffer is not used to show the actual desired image. Instead, the border areas of the frame buffer content are black and the actual image content is inside the borders. When motion is detected, the image content is translated/rotated to the opposite direction of the movement. Thus, the camera sensor's full resolution is not used to capture the desired image but utilized for stabilization (FIG. 10).

The following implementation scenarios are within the scope of the image stabilisation invention.

Implementation 1: The projector 500 and the camera 300 are physically mounted on the same frame (FIG. 7). This has the advantage that the relation between the projector 500 and the camera 300 is constant and hence this eases image stabilization.

The camera 300 captures the view towards the projection plane (FIG. 9). There is a digital signal processing apparatus that detects a recognisable pattern from the projection plane. The pattern can be something already existing in the camera's viewing area (e.g. spot on the wall, door frame etc.), or the user can attach a sticker that has a pattern that is easily recognized to detect projector movements (translation and rotation). Digital signal processing apparatus is used to detect the projector movement relative to the projection plane. The projector's movement can be detected, for example, using similar methods used in motion estimation in video coding. The motion information is used to control the stabilization in the frame buffer (FIG. 10).

Implementation 2: The projector 500 and the camera 300 are physically mounted on separate frames (multi-part). The camera 300 is in stable position with reference to the projection plane. This is otherwise the same as Implementation 1, but the position of the projection plane with reference to the camera 300 does not need to be recognized. It is enough to detect the movement of the projected image within the captured view.

Implementation 3: The projector 500 and the camera 300 are physically mounted on separate frames (multi-part). This is otherwise the same as Implementation 1, but additional clues from the environment are necessary to perform the image stabilization operators. The camera 300 and the projector 500 are moving independently of each other. Similarly to implementation 1, the system is detecting the movement of the projector with reference to the projection plane. Additional processing is needed to compensate the camera's movement Similarly to implementation 1, the camera 300 is capturing the view towards the projection plane. A visible pattern is detected as in implementation 1, but additionally the position of the projected image is also detected in the projection plane. The projected image can be detected by having a reference image taken from the projection plane before the projection is started. The projected image can also have some detectable pattern visible to the camera 300, typically in the corner and/or border areas of the projected image (for example, the aforementioned markers). The projector can also include a separate system that projects a detectable pattern to the projection plane, e.g. a (user visible/user non-visible) light beam with a detectable pattern.

Figure 11:
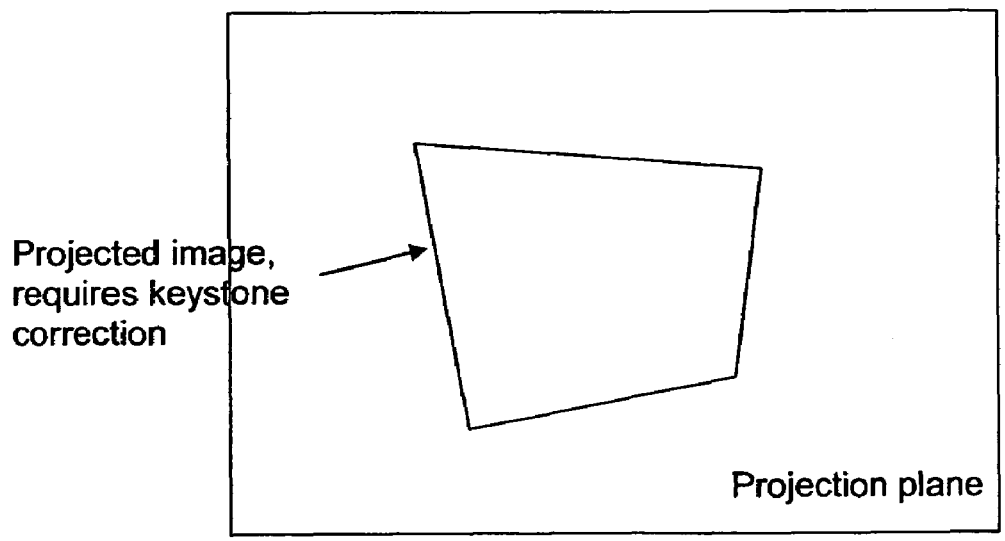
FIG. 11 shows a representation of a projected image with geometric distortion.
Figure 12:
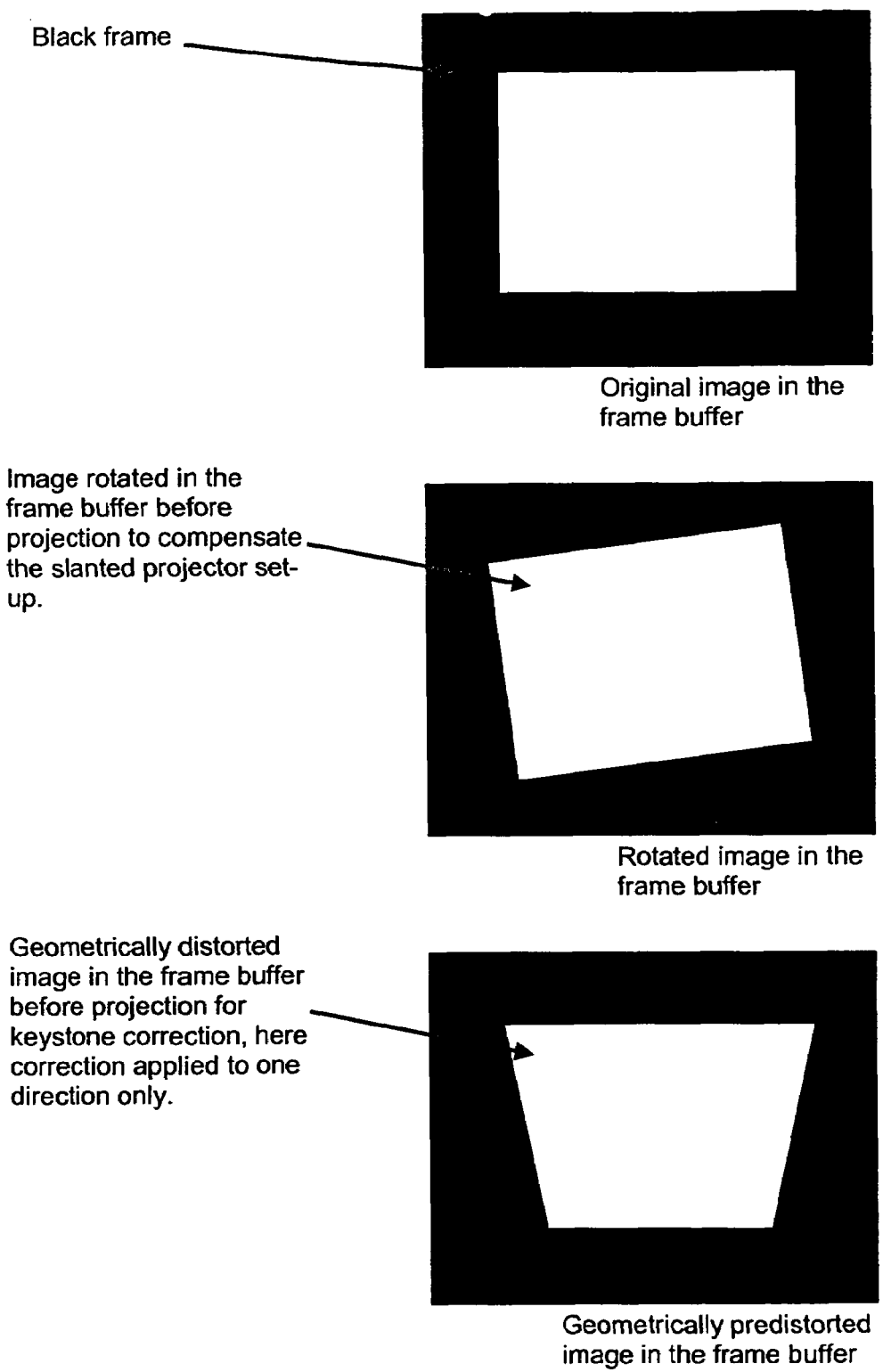
FIG. 12 shows a representation of rotation and keystone correction in a frame buffer according to one or more aspects and/or embodiments of the present invention.

Let us now consider aspects and/or embodiments relating to correction of geometric and/or rotation distortion of a projection image (FIGS. 11 and 12). As shown in FIG. 11, projected images can often suffer from geometric distortion and/or unwanted rotation of the projected image. These distortions are perceived by a user to require correction.

The geometrical distorted and/or rotated image is corrected using digital signal processing methods without any mechanical components. A camera sensor from a digital camera 300 is used to capture a view from the projection surface. The viewing angle of the camera sensor is typically larger than the projection angle (FIG. 9). The camera's line of sight is pointing to the direction of the projection (FIG. 7). The camera's line of sight may or may not be orthogonal to the projection plane.

The projected image is stored in a frame buffer of the same resolution as that used for projection. In the case of this automatic correction, the full resolution of the frame buffer is not used to show the actual desired image. Instead, the border areas of the frame buffer content are black and the actual image content is inside the borders. When keystone correction and/or rotation is applied, the image is geometrically pre-distorted and/or pre-rotated to compensate the optical distortion and/or rotation from the projection (FIG. 12).

As mentioned in the above embodiment, the captured projected image is stored in a frame buffer at the same resolution (image size in pixels). This will help the comparison process of original and captured image. However, in other embodiments, the captured projected image can be stored in a different resolution to that of the original image.

As previously mentioned, the view captured by the camera 300 is used to analyse the geometrical distortion and/or rotation of the projected image. This information is used to compensate for the distortion and/or rotation. The image correction is implemented by manipulating the projected image content digitally before the projection.

The following implementation scenarios are within the scope of the present invention relating to geometric distortion and rotation correction.

Implementation 1: The camera's line of sight is orthogonal to the projection plane and the camera 300 is horizontally levelled. This has the advantage that the view captured by the camera 300 is not rotated or geometrically distorted with reference to the projection plane.

Digital signal processing circuitry is used to detect the borders of the projected image on the projection surface. The borders form a quadrilateral that can be rotated due to the un-levelled projector set-up. The rotation angle is calculated and is used to compensate for the rotation before the projection as depicted in FIG. 12.

If the quadrilateral is not a rectangle (due to the non-orthogonal set-up of the projector with reference to the projection plane), the geometric distortion is calculated from the angles of non-orthogonal corners of the quadrilateral. This information is used for keystone correction as depicted in FIG. 12.

Implementation 2: The camera's line of sight is not orthogonal to the projection plane and/or the camera 300 is not horizontally levelled, therefore the view captured by the camera 300 is rotated and/or geometrically distorted with reference to the projection plane.

The captured view is distorted and therefore needs to be also compensated. This is possible if the projection plane itself has visible horizontal and vertical lines in the view captured by the camera 300. These lines can be detected by digital signal processing apparatus and used as a reference. The borders of the projected image are detected similarly to implementation 1 but the required rotation and keystone correction are calculated against the aforementioned horizontal and vertical reference lines.

The simplest implementation and typically the best quality is possible if the camera 300 is a separate device from the projector 500 and the projector 500 is placed on a stable position.

The projector 500 is placed to a desired location and switched on. The user takes a photo of the projected image so that the camera 300 is orthogonal to the projection plane and is horizontally levelled. This captured image is analysed (either in the camera 300, phone 400 or the projector 500) and the required correction is calculated. The correction is applied to the projected image to be projected by the projector 500.

In another use case, the projector 500 does not need to be in a stable position and the camera 300 does not need to be orthogonal to the projection plane. This requires much more processing performance to analyse the required correction and the final quality may possibly be lower. It may be also difficult to find horizontal and vertical reference lines from the projection plane. Furthermore, visible lines in the projection plane are not necessarily horizontal/vertical and this can be very difficult to analyse in the signal processing apparatus.

Visible horizontal and vertical reference lines can be already in the projection plane (e.g. door frames, window frames, wall border etc.) or the user may attach a separate projection screen with detectable borders (e.g. the previously mentioned markers).

Figure 13:
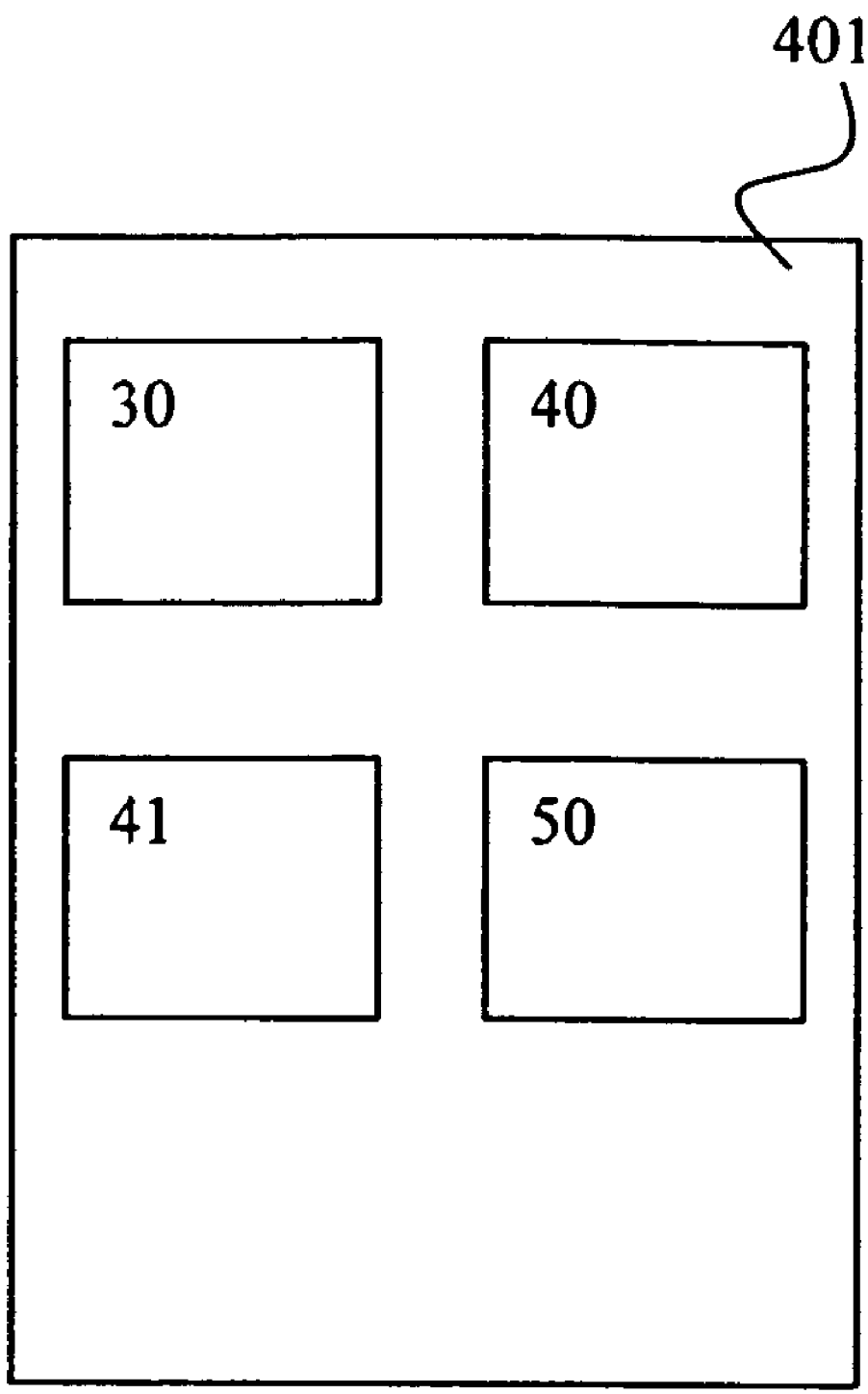
FIG. 13 shows a schematic illustration of the circuitry elements according to one or more aspects and/or embodiments of the present invention.

A schematic representation of the elements used in the above-mentioned (e.g. mobile) embodiments is shown in FIG. 13. The various elements may be integrated into one device or be separate elements in separate devices which are connectable together using wired or wireless connection mechanisms. The projection processing circuitry 401 comprises image capturing circuitry 30, distortion calculating circuitry 40, and projection image circuitry 41. The various circuitries mentioned may comprise one or more processors, memories, transmission hardware elements (e.g. radio receivers/transmitters/transceivers/bus lines), and associated computer program codes.

The image capturing is done under the control of image capturing circuitry 30, the distortion calculation by distortion calculating circuitry 40 and correction of a projection image prior to projection done projection image circuitry 41. The projection image circuitry 41, which uses the correction parameters to correct a subsequent image prior to projection, may be comprised with the distortion calculating circuitry 40 (shown) or be separate to it (not shown). The corrected projection image is fed to projection circuitry 50 for projection.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims.

The invention claimed is:

1. A projection system for calculating a user perceived distortion in an image to be projected onto a projector screen, the projection system comprising:
a projector screen; and
projection processing circuitry,
the projector screen comprising one or more markers configured to be able to provide a reference picture image to be used by projection processing circuitry to allow for calculation of a user perceived geometric/color distortion in an image drat is to the projected on the projector screen or more markers comprise light emitting markers,
the projection processing circuitry comprising:
image capturing circuitry configured to provide digital capturing of a reference picture image provided by the one or more markers of the projector screen to thereby provide reference picture image data;
distortion calculating circuitry configured to calculate user perceived geometric/color distortion of the reference picture image using the reference picture image data.

2. The projection system as claimed in claim 1, wherein the one or more light emitting markers, have a light emitting state and a non-light emitting state, and where the light emitting state is provided by an energy source.

3. The projection system as claimed in claim 1, wherein the one or more light emitting markers have a light emitting state and a non-light emitting state, and where the light emitting state is provided by an integral energy source.

4. The projection system as claimed in claim 1, wherein the one or more light emitting markers have a light emitting state and a non-light emitting state, the projector screen comprising user interface circuitry to move the one or more markers into the light emitting state from the non-light emitting state.

5. The projection system as claimed in claim 1, wherein the one or more light emitting markers have a light emitting state and a non-light emitting state, the projector screen comprising user interface circuitry to receive a signal command to move the one or more markers into the light emitting state from the non-light emitting state, the user interface circuitry being configured to receive the signal command front a user interface element located on the screen.

6. The projection system as claimed in claim 1, wherein the one or more light emitting markers have a light emitting state and a non-light emitting state, the projector screen comprising user interface circuitry to receive a signal command to move the one or inure markers into the light emitting state from the non-light emitting state, the user interface circuitry being configured to receive the signal command from a remote source.

7. The projection system as chimed in claim 1, wherein the one or more light emitting markers have a light emitting state and a non-light emitting state, the projector screen comprising user interface circuitry to receive a signal command to move the one or more markers line the light emitting state from the non-light emitting state, the user interface circuitry being configured to receive the signal command from a remote control source, the signal command being transmitted from the remote control source to the user interface circuitry under the initiation of a user.

8. The projection system as claimed in claim 1, wherein the one or more light emitting markers have a light emitting state and a non-fight emitting state, the projector screen comprising user interface circuitry to receive a signal command to move the one or more markers into the light emitting state from the non-light emitting state, the user interface circuitry being configured to receive the signal command from a remote control source, the signal command being transmitted from the remote control source to the user interface circuitry without the initiation of a user.

9. The projection system as claimed in claim 1, wherein the one or more light emitting markers have a light emitting state and a non-light emitting state, the projector screen comprising user interface circuitry to receive a signal command to move the one or more markers into the light emitting state from the non-light emitting state, the user interface circuitry being configured to receive the signal command from a remote control source, the signal command being transmitted from the remote control source to the user interface circuitry over an air interface.

10. The projection system as claimed in claim 1, wherein the one or more light emitting markers have a light emitting state and a non-light emitting state, the projector screen being configured to move the one or more markers into the light emitting state from the non-light emitting state at predetermined intervals.

11. The projection system as chimed in claim 1, wherein the one or more light emitting markers are configured to emit light in the non-visual spectrum.

12. The projection system as claimed in claim 1, wherein the one or more light emitting markers are configured to emit light in the visual spectrum.

13. The projection system as claimed in claim 1, wherein the one or more light emitting markers are configured to emit light in the visual spectrum, and wherein the markets comprise fluorescent material.

14. The projection system as claimed in claim 1, wherein the one or more light emitting markers are configured to emit light in the visual spectrum, and wherein the markers comprise a fluorescent paint applied to the surface of the projector screen.

15. The projection, system as claimed in claim 1, wherein one or more of the light emitting markers are of a color distinct from the color of the projection viewing area.

16. The projection system as claimed in claim 1, wherein one or more of light emitting markers are positioned around the projection viewing area of the screen.

17. The projection system as claimed in claim 1, wherein one or more light emitting markers are positioned around the projection viewing area to form a frame around the projection viewing area.

18. The projection system as claimed in claim 1, wherein the projector screen is portable.

19. The projection system as claimed in claim 1, wherein the projector screen comprises a projection viewing area made from a foldable material.

20. The projection system as claimed in claim 1, wherein the projector screen comprises a projection viewing area made from a foldable parachute-based material.

21. The projection system as claimed in claim 1, wherein the projection system further comprises projector screen user interface circuitry configured to be able to control the activation of the one or more light emitting markers of the projector screen, the light emitting markers have a light emitting state and a non-light emitting state and being configured to be used by projection processing circuitry to calculate a user perceived geometric/color distortion in an image to be projected on the projector screen when one or more of the markers are in a light emitting state, the projector screen user interface circuitry being configured to receive a signal command to move the one or mare markers into the light emitting state from the non-light emitting state.

22. The projection system as claimed in claim 1, wherein the projector screen is a portable projector screen, the projector screen comprising a projection viewing area, and wherein the projection viewing area is made from a foldable material.

23. The projection system as claimed in claim 22, wherein the foldable material has similar foldable properties to parachute material.

24. The projection system as claimed in claim 22, wherein the foldable material comprises same parachute material.

25. The projection system as claimed in claim 22, wherein the foldable material is a parachute material.

26. The projection system as claimed in claim 22, wherein the projector screen comprises a collapsible frame in which the unfolded material can be framed to provide the viewing area configured to receive a projected image.

27. The projection system as claimed in claim 22, wherein the projection viewing area is nude from a semi-transparent material allowing viewing of a projected image from the viewing area and from an area on the reverse face of the viewing area.

28. The projection system as claimed in claim 1, wherein the projector screen is collapsible.

29. The projection system as claimed in claim 1, the projector screen comprising a frame, wherein the frame is configured to allow for the screen to move from a folded collapsed configuration to an unfolded configuration.

30. The projection system as claimed in claim 29, wherein the frame is formed from telescopic parts which are configured to be opened to form the frame.

31. The projection system as claimed in claim 30, wherein:
the frame is formed from a flexible wire;
in the folded configuration, the wire is folded back upon itself; and
in the unfolded configuration, the wire opens into the frame.

32. The projection system as claimed in claim 31, wherein the wire of the frame is configured to open our into the unfolded configuration when unbiased.

33. The projection system as claimed in claim 1, wherein the distortion calculating circuitry is further configured to generate one or more correction parameters using the reference picture image data.

34. The projection system as claimed in claim 33, the projection processing circuitry further comprising:
projection image circuitry configured to use one or more of the correction parameters generated by the distortion calculating circuitry to adjust the projection properties of a subsequent image to be projected to compensate for the user perceived geometric/color distortion.

35. The projection system as claimed in claim 1, wherein the distortion Correction parameters are generated by comparing one or more properties of the captured digital reference picture image determined from the reference picture data with one or more predetermined properties of the reference picture.

36. The projection system as claimed in claim 1, wherein the image capturing circuitry is configured to capture a reference picture in the non-visual part of the spectrum.

37. The projection system as claimed in claim 1, wherein the image capturing circuitry is configured to provide reference picture image data relating to the image quality of the reference picture image, the image quality relating to the intrinsic properties of the reference picture.

38. The projection system as claimed in claim 1, wherein the image capturing circuitry is configured to provide reference picture data relating to the image quality of the reference picture, the image quality relating to the intrinsic properties of the reference picture, the intrinsic property including one or more of brightness, colour correction; auto white balance, contrast, background texture information.

39. The projection system as claimed in claim 1, wherein the distortion calculating circuitry is configured to use the distance between a projector apparatus and image capturing apparatus to calculate one or more correction parameters.

40. The projection system as claimed in claim 1, wherein the distortion calculating circuitry is configured to calculate the relative movement of the projector with respect to a reference image on a projection screen to determine correction parameters to compensate for the relative movement.

41. The projection system as claimed in claim 1, wherein the image capturing circuitry is configured to capture the relative movement of the projector with respect to a reference image on a projection screen by capturing the movement of the reference image within a captured view to determine reference picture image data relating to the relative movement.

42. The projection system as claimed in claim 1, wherein the distortion calculating circuitry is configured to calculate the rotational distortion of a reference image to determine correction parameters to compensate for the rotational distortion.

* * * * *

UNITED STATES PATENT AND TRADEMARK OFFICE
CERTIFICATE OF CORRECTION

PATENT NO. : 7,717,569 B2  Page 1 of 1
APPLICATION NO. : 11/404379
DATED : May 18, 2010
INVENTOR(S) : Tomi Sokeila et al.

It is certified that error appears in the above-identified patent and that said Letters Patent is hereby corrected as shown below:

In column 17, line 14 (claim 1, line 10) "drat" should be --that--.

In column 17, line 49 (claim 6, line 5) "inure" should be --more--.

In column 17, line 65 (claim 8, line 3) "fight" should be --light--.

In column 18, line 30 (claim 13, line 3) "markets" should be --markers--.

In column 19, line 17 (claim 27, line 2) "nude" should be --made--.

In column 19, line 37 (claim 32, line 2) "our" should be --out--.

In column 20, line 5 (claim 35, line 2) "Correction" should be --correction--.

Signed and Sealed this

Thirty-first Day of August, 2010

David J. Kappos
*Director of the United States Patent and Trademark Office*